– – –

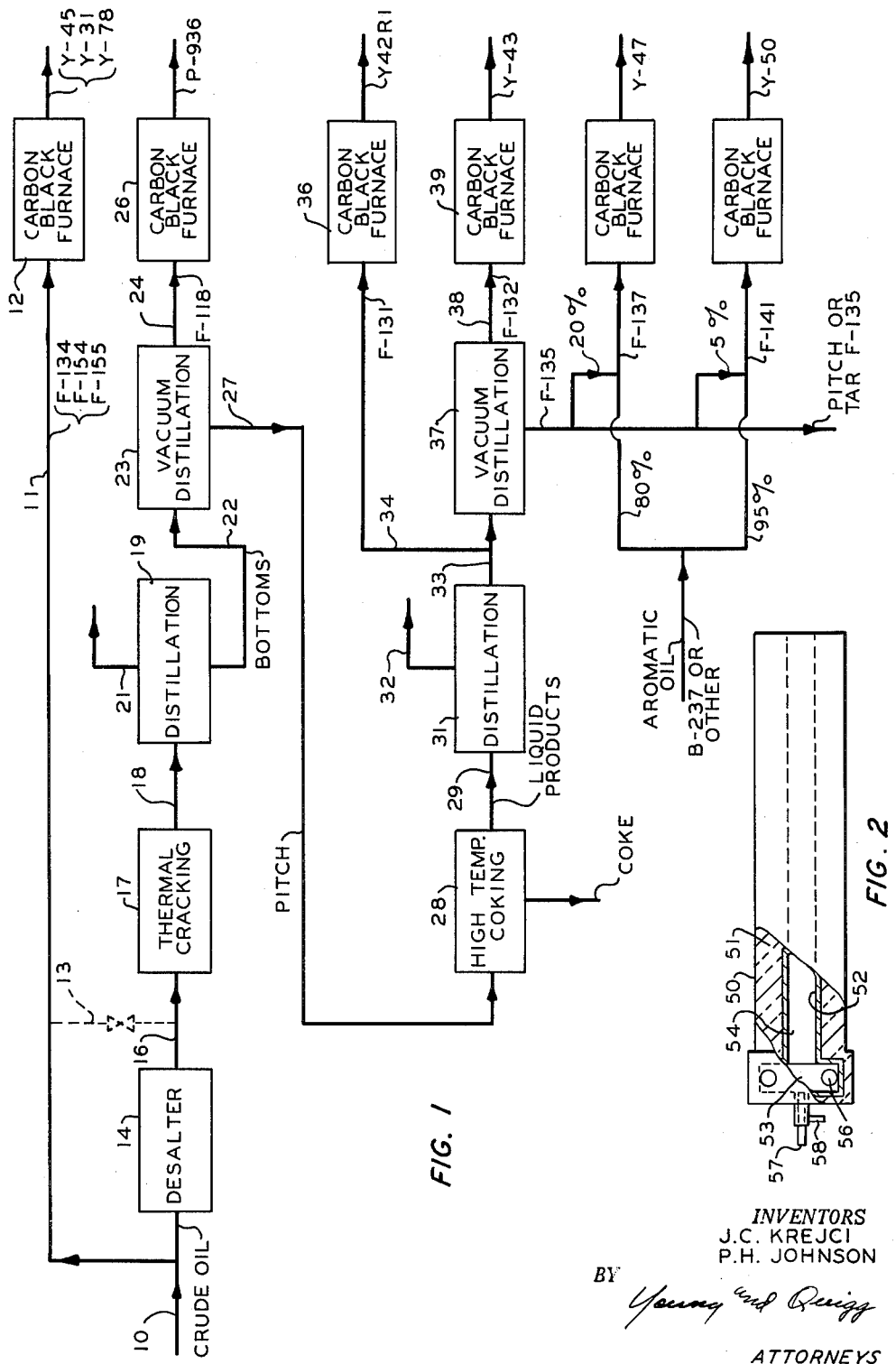

3,240,565
PRODUCTION OF CARBON BLACK
Joseph C. Krejci, Phillips, Tex., and Paul H. Johnson, Bartlesville, Okla., assignors to Phillips Petroleum Company, a corporation of Delaware
Filed Nov. 3, 1961, Ser. No. 149,986
10 Claims. (Cl. 23—209.4)

This invention relates to the production of carbon black. In one aspect this invention relates to the production of a relatively low structure furnace carbon black from selected feedstocks, defined further hereinafter.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of this rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a close correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to a carbon black, is meant characteristics of the carbon black particles which relate to flocculation of said particles. The structure is said to be high when there is a strong tendency for the particles to form chains of particles. Conversely the structure is said to be low when there is little tendency to form such chains. "High structure" carbon black is generally considered to have an oil absorption of about 1.35 to 1.45 cc. per gram and this is the usual range for prior art furnace blacks. "Normal structure" carbon black is considered to have an oil absorption of about 0.75 to 1.2 cc. per gram and in the prior art such blacks have generally been made by the channel black process. "Low structure" carbon black is considered to have an oil absorption of about 0.45 to 0.55 cc. per gram and in the prior art such blacks are made by the thermal process.

Despite the widespread and increasing use of furnace blacks in applications formerly served by channel blacks, there are some uses for which channel blacks are still regarded as superior by some persons skilled in the art. For example, in reinforcing natural rubber products and in specific applications, for example, in non-squeal soft-riding tires. It is then desirable to furnish the art with a furnace black having a structure comparable to that of channel black. Our invention provides such a furnace black which, since it has a relatively low structure as compared to carbon blacks normally produced by a furnace process, is designated herein as a "relatively low structure furnace carbon black."

Since it is not convenient to measure the structure directly, the oil absorption of the black is commonly used as a "measure" of the structure. It has been found that the oil absorption of a carbon black correlates closely with certain properties, such as modulus, of a rubber having the carbon black compounded therein. Measurement of oil absorption gives a quick reliable measure of the structure of the carbon black. It is thus possible to obtain a rapid measure of one of the most important properties of a carbon black insofar as rubber compounds prepared with said carbon black are concerned.

We have found that furnace carbon blacks produced from hydrocarbon feedstocks containing at least 1.5 parts, by weight, of potassium per million parts, by weight, of hydrocarbon feedstock have a relatively low structure as compared to carbon blacks normally produced from most other feedstocks by a furnace process. We have also found that the topped liquid products recovered from the high temperature coking of certain petroleum residues are a good feedstock for the production of a relatively low structure carbon black by the furnace process. We have further found that the pitch recovered from said liquid products formed during the coking of petroleum residues is an excellent additive for adding to conventional aromatic feedstocks to enable the production of relatively low structure furnace carbon black from said conventional feedstocks which would otherwise produce a high structure carbon black.

Thus, broadly speaking, the present invention resides in providing feedstocks for the production of relatively low structure furnace carbon blacks, additives for blending with conventional feedstocks to produce feedstocks which are suitable for the production of relatively low structure furnace carbon blacks, methods for producing relatively low structure carbon blacks by the furnace process from said feedstocks, and a carbon black product containing a small but effective amount of potassium sufficient to lower the structure of said carbon black product.

Blacks made by our invention have a lower structure than is usual for furnace blacks having approximately the same particle size and, therefore, are said to have relatively low structure. The blacks of our invention generally have an oil absorption in the range of about 0.7 to about 1.2 cc. per gram and are useful in reinforcing natural and synthetic rubbers, giving properties similar to that obtained when channel blacks are used. They are thus valuable as replacements for the channel blacks which are gradually being priced out of the market due to increasing cost of the raw material natural gas from which they are made. All of the above figures for oil absorption are for unpelleted black. Working tends to reduce this value and pelleted blacks have values approximately 0.1 lower in all ranges.

Accordingly, an object of this invention is to provide feedstocks for the production of a relatively low structure furnace carbon black. Another object of this invention is to provide a relatively low structure furnace carbon black which can be used to replace low structure carbon blacks made by other processes in the compounding of rubber and other uses. Another object of this invention is to provide additives which when blended with a conventional aromatic feedstock will enable the production of a relatively low structure furnace carbon black from said conventional feedstock which would otherwise yield a high structure furnace carbon black. Another object of this invention is to provide a heavy naphthenic crude oil as a superior charging stock for the production of a relatively low structure furnace carbon black. Still another object of this invention is to provide a process for making from a heavy naphthenic crude oil a superior feedstock for the production of a low structure furnace carbon black. Still another object of this invention is to provide a process for making relatively low structure furnace carbon blacks from said feedstocks. Another object of this invention is to provide a relatively low structure furnace carbon black product containing a small but effective amount of potassium. Other aspects, objects, and advantages of the invention will be apparent to those skilled in the art in view of this disclosure.

Thus according to the invention, there is provided a process for producing a relatively low structure furnace carbon black having an oil absorption value of not more than 1.2 cc. per gram, which process comprises: charging to a carbon black producing furnace a hydrocarbon feedstock containing at least 1.5 parts of potassium per million parts, by weight, of said feedstock; partially burning said feedstock in said furnace under carbon black producing conditions to produce said carbon black; and recovering said carbon black from the effluent from said furnace.

Further according to the invention, there is provided a relatively low structure carbon black product having an oil absorption value of not more than 1.2 cc. per gram and containing a small but effective amount of potassium sufficient to obtain said low structure.

Any hydrocarbon feedstock containing at least 1.5 parts of potassium per million parts, by weight, of the feedstock can be used in the practice of the invention to produce the relatively low structure carbon blacks of the invention.

The potassium present in the hydrocarbon feedstocks can be either a connate material, i.e., a potassium material or compound naturally occurring in said feedstocks, or a potassium containing material or compound can be added to said feedstock. Furthermore, said potassium material or compound is effective in whatever form it is present in. Thus, said potassium material or compound can be present in an inorganic form, e.g., the chloride, the sulfide, the carbonate, the nitrate, the hydroxide, etc.; or in an organic form such as metallo-organic compounds, salts of organic acids including fatty acids, potassium alkyls, etc.

Thus, as used herein and in the claims, unless otherwise specified, the term "potassium" is employed generically and includes all forms of potassium, e.g., inorganic or "organic," in which the potassium can be present in the hydrocarbon feedstock.

The amount of potassium present in the hydrocarbon feedstocks utilized in the practice of the invention can vary within rather wide limits depending upon the exact nature of the carbon black forming reaction being utilized, the properties of the particular hydrocarbon feedstock being utilized, and the desired amount of lowering or regulation of the structure or oil absorption of the carbon black product. In all instances, the amount of potassium in the hydrocarbon feedstock will be a small but effective amount sufficient to effect the desired lowering or control of the structure or oil absorption of the carbon black product. In accordance with the invention, the hydrocarbon feedstock will contain at least 1.5, preferably at least 5, parts of potassium per million parts, by weight, of the feedstock. In general, the amount of potassium present in the feedstock will be within the range of from 1.5 to 500 parts per million parts, by weight, of the feedstock; although higher amounts up to as much as 1500 or 2000 parts of potassium per million parts, by weight, of the feedstock can be present. However, it has been noted that the effectiveness of the potassium in lowering the structure of the carbon black product is much greater in the lower ranges of potassium concentration, i.e., the incremental lowering of the structure of the carbon black product decreases as the concentration of potassium increases in the hydrocarbon feedstock.

One presently preferred class of hydrocarbon feedstocks containing connate potassium which can be used in the practice of the invention are petroleum crude oils, particularly the heavy naphthenic petroleum crude oils. Petroleum crude oils are commonly classified as paraffin base, intermediate or mixed base, naphthene base, and aromatic or benzenoid base. As is well known to those skilled in the art, the hydrocarbons which are present in petroleum are present in very complex mixtures which have never been completely separated into their component compounds and consequently the exact structure of all the molecules making up these mixtures have never been completely determined. Methods of characterizing these mixtures are available, however, for example, in K. van Nes and H. A. van Westen, "Aspects of the Constitution of Mineral Oils," Elsevier Publishing Company, New York (1951), whereby the distribution of the carbon among naphthenic rings, aromatic rings, and aliphatic chains can be determined, see pages 281–287. Other methods of analyzing and classifying crude oils are discussed in W. L. Nelson, "Petroleum Refinery Engineering, third edition, McGraw-Hill Book Company, New York (1949), on pages 16–19 and 85–132. Classification of an oil as a naphthenic oil usually means that the oil contains a dominant amount of hydrocarbons containing naphthene rings. However, such oils frequently contain varying and appreciable amounts of hydrocarbons containing aromatic rings, as well as other types of hydrocarbons such as paraffins.

Heavy naphthenic crude oils suitable for use in the practice of the invention include those having an API gravity of less than 20 degrees, an initial boiling point above 350° F., less than 10 volume percent and preferably less than 5 volume percent boiling below 400° F. at atmospheric pressure, a viscosity in SUS at 210° F. within the range of about 40 to 600, a Bureau of Mines correlation index (referred to hereinafter as BMCI) above 65, and contain at least 1.5 parts of connate potassium per million parts, by weight, of oil.

One example of such heavy naphthenic crude oils are certain crude oils produced from the Morichal field, Oficina sands, in the state of Monagas, Venezuela. Said crude oils will be referred to hereinafter as Monagas crude oils. Said Monagas crude oils usually have an API gravity within the range of about 2 to about 14°, an initial boiling point above 350° F., a viscosity in SUS at 210° F. within the range of about 225 to 600, a Conradson carbon residue within the range of about 10 to 20 weight percent, and contain at least 1.5 parts per million parts, by weight, of connate potassium. Other heavy naphthenic crude oils containing at least 1.5 parts of connate potassium per million parts, by weight, of oil and suitable for use in the practice of the invention include Bella Vista crude oil, produced from the Bella Vista field in the State of Guarico, Venezuela, and Boscan crude oil, produced from the Boscan field in the State of Zulia, Venezuela. Tests on typical samples of the last two mentioned crude oils are given in Table I-A below.

Naphthenic crude oils which do not contain at least 1.5 parts of potassium per million parts, by weight, of oil are not suitable as charge stocks for the production of relatively low structure furnace carbon blacks because the carbon black produced therefrom will be a high structure carbon black. An example of such a heavy napthenic crude oil which yields a high structure carbon black when used as the charging stock in a furnace process is McFadden crude oil, produced from the McFadden field in Victoria County, Texas. Tests on a typical sample of said McFadden crude oil are set forth in Table I-A below. Thus, it was surprising to find that heavy napththenic crude oils having the properties set forth or referred to in the preceding paragraph will yield a relatively low structure furnace carbon black when utilized as the charging stock in a furnace black process.

As set forth in more detail hereinafter, superior feedstocks for the production of both relatively low structure carbon black and high structure carbon black can be prepared from said heavy naphthenic crude oils containing connate potassium. Thus, further according to the invention, there is provided a process for producing an aromatic feedstock for the production of carbon black, which process comprises: charging to a thermal cracking operation a heavy naphthenic crude oil having an API gravity of less than 20 degrees, and a SUS viscosity at 210° F. within the range of about 40 to about 600; distilling the effluent from said cracking operation to obtain a pitch residue; charging said pitch to a coking operation; and recovering said aromatic feedstock from the liquid products formed during said coking operation.

Additives containing high concentrations of potassium can be prepared from said naphthenic crude oils containing connate potassium. Said additives are useful for adding to hydrocarbon feedstocks which would otherwise yield a high structure carbon black. Thus, still further according to the invention, there is provided an additive for adding to a conventional aromatic feedstock to enable the production of a relatively low structure carbon black by a furnace process from said conventional feedstock which would otherwise yield a high structure carbon black; said additive having been prepared by charging a petroleum residue to a high temperature coking operation, vacuum distilling the liquid products produced during said coking operation, and recovering a pitch or tar from said vacuum distillation as said additive.

Still further according to the invention, there is provided an improved charging stock, for the production of a relatively low structure carbon black by a furnace process, which comprises a blend of said additive produced as described above, with a conventional aromatic oil feedstock.

Conventional hydrocarbon feedstocks for the production of high structure carbon blacks include a wide variety of feedstocks. One presently preferred conventional feedstock is an aromatic concentrate oil prepared by the liquid sulfur dioxide extraction of cycle oils obtained in the catalytic cracking of gas oils. Tests on typical samples of such aromatic concentrate oils are given in Table II–A below under the headings of H, H2, and H3. However, conventional aromatic oils used in the production of furnace carbon blacks can include oils other than extract oils produced by liquid sulfur dioxide extraction of cycle oils. Typical properties of conventional aromatic concentrate oils are: boiling range 400–1000° F., BMCI 75 to 130, and an API gravity of from about 0 to about 20°. The invention is not to be limited to the use of such aromatic concentrate oils, however. Other oils such as kerosene, gasoline boiling range hydrocarbons, heavy or light naphthas, or even oils heavier than recycle gas oils can be used. Hydrocarbons from other sources than petroleum likewise can be utilized, as for example, coal tar distillates and shale distillates. These various charge stocks may contain most any class of hydrocarbon compound, as for example, saturated or unsaturated hydrocarbons, paraffins, olefins, aromatics, naphthenates, etc.

While it is not intended to limit the invention to any theory of operation, it is presently believed that the depressing effect of the potassium on the structure of the carbon black product is due to some modification of the carbon black forming reaction itself which results in the potassium being retained in or on said carbon black product. It has been noted that said potassium must be present during the carbon black forming reaction. It has been noted that introduction of potassium containing material at the downstream end of the carbon black forming reaction zone resutls in little, if any, effect upon the structure of the carbon black product. It is presently believed that the action of the potassium is due, in some way not presently known, to the presence of potassium ions in the reaction section of the carbon black furnace during the formation of the carbon black, and said ions either change the manner in which the ultimate carbon black particles adhere together (structure), or result in chemical bonding of said ions to the carbon crystallites, resulting in the presence of potassium in the final product being an important factor.

Analyses have shown in carbon black producing runs wherein a potassium containing compound is included in the hydrocarbon feedstock that up to 50 percent, and more usually up to from 75 to 100 percent, of the potassium (calculated as the metal) is retained in or on the carbon black product. Just what form, e.g., oxide or other, said retained potassium is in, or just how it is associated with the carbon black particles themselves, is not presently known. It is clear, however, that the potassium, in some form and some manner of association, is present in the carbon black product in small but effective amounts sufficient to have caused, in some manner, an appreciable lowering of the structure of said carbon black product. In carbon black producing runs charging a hydrocarbon feedstock containing potassium, it has been observed that the concentration of potassium (calculated as the metal) in the carbon black product is from approximately 1 to approximately 4 times the concentration of potassium in the hydrocarbon feedstock. Actual analyses have shown the potassium to be present in the carbon black product in small but finite amounts.

Further details regarding the production of relatively low structure furnace carbon blacks from the connate potassium containing heavy naphthenic crude oils of the invention are set forth below. It was surprising to find that fractions of said connate potassium containing heavy naphthenic crude oils, even after said crude oils have been subjected to a mild thermal cracking such as a vis-breaking operation, will not yield a relatively low structure carbon black when utilized as the charging stock in a furnace black process. However, in accordance with our invention, superior feedstocks for the production of relatively low structure furnace carbon blacks can be prepared from fractions of said heavy naphthenic crude oils. Referring to FIGURE 1 of the drawings, this feature of the invention will be more fully explained.

FIGURE 1 is a block diagram illustrating the processing steps and means employed in carrying out the various embodiments of the invention.

FIGURE 2 is a diagrammatic representation of one type of carbon black furnace which can be employed in the practice of the invention.

In FIGURE 1 the "F" numbers ahead of each carbon black furnace are numbers assigned to various feed stocks used in the examples hereinafter. The "Y" or "P" numbers following each carbon black furnace are run numbers in a carbon black furnace. Said numbers are supplied in the drawing for convenience in correlating the data given in the data tables of the specific examples.

In the practice of one aspect of the invention a raw heavy naphthenic crude oil from line 10 is charged via line 11 into carbon black furnace 12 and therein partially burned under carbon black producing conditions to yield a relatively low structure furnace carbon black. If desired, a desalted crude oil can be passed via lines 13 and 11 into said furnace 12 for the production of a relatively low structure furnace carbon black.

In preparing the special feedstocks of the invention, it is preferred to use a desalted crude oil. Accordingly, crude oil from line 10 is passed into desalter 14, which can comprise any suitable type of conventional desalting process such as electrical desalting. In said desalter the salt content of the crude oil is usually reduced to the order of 1 to 3 pounds per thousand barrels of crude oil. Desalted crude oil is passed via line 16 to thermal cracking unit 17 wherein the crude oil is subjected to cracking conditions such as conventional visbreaking conditions, i.e., high velocity of oil through a furnace coil, high heat transfer rates in said coil, etc. The actual conditions employed will, of course, vary with the oil being treated. Typical operating conditions include: temperature of furnace coil outlet, within the range of from 850 to 1150°

F., pressures within the range from 50 p.s.i.g. to 250 p.s.i.g., and more preferably as low as condenser conditions will permit. As will be understood by those skilled in the art, said visbreaking operation comprises a mild or light thermal cracking. The coil effluent from the visbreaker is passed via line 18 to a flash distillation vessel 19 (sometimes referred to as a hot oil separator) wherein gas and distillate products are flash vaporized and removed via line 21. The amount of products removed overhead via line 21 will, of course, depend upon the nature of the crude oil charged to said visbreaking operation and the conditions of said visbreaking operation. Usually, those materials nominally boiling below about 650° F. are removed in via line 21.

Bottoms product from said flash distillation is passed via line 22 into a vacuum distillation unit 23. Operating conditions in said vacuum distillation unit 23 will, of course, depend upon the oil charged thereto. In said unit the temperature will usually be in the range of from 600 to 900° F. and the pressure within the range of from 0.1 to 20 millimeters of mercury. Said vacuum distillation is usually carried out as a flash distillation and there is removed overhead a distillate having a nominal boiling range of from 650 to 1050° F. Said distillate is removed via line 24 and charged to carbon black furnace 26 where when partially burned under carbon black producing conditions there is produced a high structure furnace carbon black.

Bottoms product from said vacuum distillation unit 23 consisting of a pitch having a nominal initial boiling point of about 1050° F. is charged via line 27 to a Curran-Knowles high temperature coking unit 28. Said coking unit or oven comprises a sole-type, broad-oven designed by the Curran Carbonizing and Engineering Company. Said unit comprises an arched rectangular chamber having a floor constructed of carborundum brick. The oven is heated by gas burners located under said floor. During a coking run the pitch in relatively small lumps (about ½ inch) is charged at intervals through a port in the top of the oven until the oven capacity has been reached. The oven is usually operated at a temperature between 1500 to 1900° F. In operation the coking is considered complete when the gas make drops off, e.g., to less than 100 cubic feet per hour and the coke is then removed from the oven. Vapors from the oven are condensed during the operation to give liquid products which are here shown as removed through line 29.

Said liquid products are charged to a distillation unit 31 and there distilled to remove a fraction nominally boiling at 400° F. and less, which fraction is removed via line 32. The remainder of said liquid products, having a nominal boiling point of 400° F. and higher, is an excellent charging stock for the production of a relatively low structure furnace carbon lack. Said material is removed via line 33 and a portion thereof passed via line 34 to carbon lack furnace 36. This material is identified further hereinafter as charge stock F-131 and as set forth in Example II below produces a relatively low structure carbon black when partially burned in said carbon black furnace 36 under carbon black producing conditions. The properties of this topped liquid product will, of course, vary with the original crude oil charge, the processing steps which said crude oil is subjected to up to this stage of the operation, and the operating conditions employed in said processing steps. Thus, such a product can have an initial boiling point as low as 300° F. and lower. It appears that the naphthene hydrocarbons in the crude oil have been converted to highly condensed aromatic materials because said material is highly aromatic as shown by its BMCI values. The BMCI values on these materials can range from 75 to 130. Said materials usually have an API gravity within the range of 0 to 20° and a viscosity in SUS at 210° F. within the range of 75 to 130.

The BMCI correlation index referred to above and elsewhere herein is a correlation index developed by the Bureau of Mines and is employed to denote aromaticity of an oil; a higher numerical index denoting a more aromatic oil. The index is calculated from the formula $$C.I. = \frac{48640}{K} + 473.7G - 456.8$$

where:
C.I.=Bureau of Mines correlation index
$K$=Average boiling point (° K.)
$G$=Specific gravity @ 60° F./60° F.

A portion of said topped liquid products from line 33 can be passed into vacuum distillation unit 37 and there subjected to conditions within the range of those described above for vacuum distillation unit 23 to produce, for example, a vacuum distillate having a nominal boiling range of 400 to 960° F. and a pitch or tar product having a nominal initial boiling point of 960° F. Said nominal 400–960° F. vacuum distillate can be charged via line 38 to carbon black furnace 39, and as set forth in Example II below, when partially burned under carbon black producing conditions yields a high structure furnace carbon black. Said nominal 960° F. initial boiling point pitch or tar is an excellent blending stock or additive for blending with conventional aromatic oils (which normally produce high structure furnace carbon blacks) to give blended feedstocks which are excellent feedstocks for the production of relatively low structure furnace carbon lacks as set forth below in Example III. The properties of said pitch or tar will, of course, depend upon the original crude oil and the processing steps applied to said crude oil. Typical properties of such a pitch or tar are: specific gravity from 1.0 to 1.3; benzene insolubles from 7 to 30 weight percent; and a ring and ball softening point ranging from 175 to 375° F. Said pitch or tar can be blended with said conventional oil in amounts of from about 4 to 50 weight percent of the resulting blend.

The above boiling ranges and ranges of other properties for the various oils, etc. described have been included for illustrative purposes and are not to be considered as unduly limiting the scope of the invention.

The various processing steps described above are, per se, individually old and well known in the art and, individually, form no part of our invention. Our invention resides in particular combinations of said steps, defined in the claims, which mutually cooperate and/or coact to achieve or obtain a new result.

Our invention is not limited to any particular individual form of apparatus, per se, employed for carrying out the various individual processes employed in the practice of the invention. Said individual processes can be carried out in any suitable conventional apparatus and the various charge stocks produced according to said processes can be converted into furnace carbon blacks in any suitable furnace known to the art for the production of furnace carbon blacks. However, one aspect of our invention does reside in combinations of the various means employed to carry the various combinations of processing steps.

FIGURE 2 of the drawings illustrates in diagrammatic form the general construction and the general shape of one presently preferred type of carbon black furnace which can be employed in the practice of the invention. In said FIGURE 2 the reference numeral 50 identifies a steel shell within which is disposed insulation material 51. Said insulation material 51 is held in place by a refractory liner 52 which forms a combustion zone 53 and a reaction zone 54. Reference numeral 56 indicates the end of a burner tube or opening through the wall of combustion zone 53 for the introduction of a mixture of fuel gas and air for heating the furnace. The axis of said tube 56 is so disposed that the tube is substantially tangential to the inner cylindrical wall of combustion zone 53 so that when the incoming combustion mixture is introduced at a very high velocity the flame and combustion products enter said combustion zone tangentially. The combustion gases then follow a spiral path while passing through said combustion zone. When said gases reach the approximate center of the combustion zone they enter the long reaction zone 54 and follow a helical pattern therethrough. Oil feed or charge stock in the vapor state is introduced into said combustion zone 53 through an oil feed pipe 57. Surrounding said oil feed pipe 57 is a jacket which is connected to a pipe 58 for supplying air for the purpose of preventing deposition of carbon on the end of oil feed pipe 57 within the furnace. All of the carbon black furnaces described above in connection with FIGURE 1 were essentially like the furnace just described. Said furnace of FIGURE 2 has the general conformity and is constructed in the manner fully described in U.S. Patent No. 2,564,700. Various modifications of said furnace which can also be used in the practice of our invention are also described in said patent. Other types of furnaces which can also be used in the practice of the invention are described in patents mentioned in said Patent 2,564,700.

In the specific examples given hereinafter, the majority of the carbon black producing runs were carried out in a pilot plant size furnace essentially like that illustrated in FIGURE 2 and having a reaction chamber 54 which was 3 inches in internal diameter and 25 inches long. The combustion chamber 53 was 4 inches long and 11 inches in diameter. In two runs a furnace was used which was essentially like that illustrated in FIGURE 2 and which had a reaction chamber 12 inches in diameter and 11 feet long. The combination chamber of this latter furnace was 12 inches long and had a diameter of 37 inches. These dimensions are given merely as examples, and any or all dimensions may be varied as desired. In modifying the furnace design it is necessary, however, to make certain that the combustion chamber has a relatively large diameter in comparison to its length, while the reverse is true for the reaction zone.

In operation of such a carbon black furnace the effluent therefrom consisting of a dense smoke comprising combustion gases having carbon black particles suspended therein is quenched at the outlet of the furnace in known conventional manner and then passed to conventional carbon black separation apparatus. The actual operating conditions of furnaces of this type are well known. Thus, the specific operating conditions, per se, of said furnaces form no part of the present invention. Full details of operating procedure and conditions can be found in said Patent 2,564,700 and other patents mentioned therein.

EXAMPLE I

Four different crude oils, (A) Monagas, (B) Bella Visa, (C) McFadden, and (D) Boscan, identified above and having the properties given below in Table I–A were each charged to a carbon black furnace of the type illustrated in FIGURE 2 and there partially burned under carbon black producing conditions to yield a furnace carbon black. Said furnace was operated under conventional conditions and the carbon black product was recovered from the furnace effluent in conventional manner. The furnace charging rates, operating conditions, and carbon black product yields and properties are set forth in Table I–B below.

Samples of each of said carbon black products were compounded with a SER 1000 rubber (defined in ASTM D–1419–58T) and the resulting rubber compositions cured to a finished rubber. The compounding recipe employed in preparing said rubber compounds was as follows:

| | Parts by weight |
|---|---|
| SBR 1000 rubber | 100 |
| Carbon black | 40 |
| Zinc oxide | 3 |
| BRT No. 7 [1] | 6 |
| Sulfur | 1.75 |
| Santocure | 0.9 |

[1] A rubber softener—a refined tar with a high free carbon content having a specific gravity of 1.20 to 1.25, available from Allied Chemical and Dye Corporation.

One group of said rubber compounds was cured 30 minutes at 307° F. and properties thereof determined in accordance with standard rubber testing procedures. The results of all tests on said rubber compounds are set forth in Table I–C below.

In comparing the data given in said Tables I–B and I–C, it is to be noted that the oil absorption values of the carbon blacks from crude oil A and crude oil B were 1.02 and 1.00 cc. per gram respectively, showing the carbon blacks to have a relatively low structure, whereas the oil absorption value for the carbon black produced from crude oil C was 1.37 cc. per gram, showing the latter carbon black to be a high structure carbon black.

*Table I–A*

PROPERTIES OF CRUDE OILS

| | A | B | C | D |
|---|---|---|---|---|
| | Monagas (F-134) | Bella Vista (F-99) | McFadden (F-154) | Boscan (F-155) |
| Gravity, ° API | 12.8 | 16.6 | 22.0 | 9.6 |
| Vac. Dist. ° F. at 760 mm. Hg: | | | | |
| First drop | 455 | 365 | 346 | 451 |
| 5% overhead | 532 | 455 | 441 | 586 |
| 10% overhead | 589 | 500 | 470 | 664 |
| 20% overhead | 690 | 551 | 503 | 796 |
| 30% overhead | 784 | 603 | 540 | 910 |
| 40% overhead | 882 | 651 | 577 | 928 |
| 50% overhead | 977 | 697 | 628 | [1] 1,080 |
| 60% overhead | [2] 1,000 | 767 | 689 | |
| 70% overhead | | 843 | 762 | |
| 80% overhead | | | 854 | |
| 90% overhead | | | [3] 935 | |
| Viscosity: | | | | |
| SUS at 100° F | 1,422 | 157.4 | 88.9 | |
| SUS at 210° F | 258.3 | 42.0 | 37.0 | |
| SUS at 122° F | 399 | | | |
| Pour Point ° F | 40 | 10 | −40 | 65 |
| Carbon content, wt. percent | 86.6 | 88.6 | 86.9 | 79.0 |
| Hydrogen content, wt. percent | 11.5 | 10.8 | 12.6 | 10.8 |
| Sulfur content, wt. percent | 1.9 | 0.2 | 0.3 | 5.3 |
| Carbon residue: | | | | |
| Ramsbottom, wt. percent | 7.3 | 3.6 | 0.74 | 9.5 |
| Conradson, wt. percent | 11.3 | | | |
| BMCI | 68.7 | 71.7 | 60.3 | [1] 75 |
| Potassium, p.p.m. (by wt.) | 9.6 | 1.7 | Nil | 7 |

[1] Estimated.
[2] 53%.
[3] 87%.

Table I-B
PRODUCTION OF CARBON BLACK

| | Crude Oil Charge | | | |
|---|---|---|---|---|
| | A | B | C | D |
| | Monagas (Run Y-45) | Bella Vista (Run Y-31) | McFadden (Run Y-68) | Boscan (Run Y-78) |
| Furnace Operating Conditions: | | | | |
| Oil feed rate, gal./hr | 4.97 | 6.0 | 5.0 | 4.33 |
| Oil preheat temp., °F | 550 | 500 | 550 | 550 |
| Tangential air rate, Mcfh | 6 | 6 | 6 | 6 |
| Tangential gas rate, Mcfh | 0.4 | 0.4 | 0.4 | 0.4 |
| Jacket air rate, Mcfh | 0.2 | 0.2 | 0.2 | 0.2 |
| Reaction section length, inches | 25 | 25 | 25 | 25 |
| Combustion section length, inches | 4 | 4 | 4 | 4 |
| Carbon Black Product: | | | | |
| Yield, lb./gal | 1.48 | 2.13 | 1.01 | |
| Photelometer | 90 | 87 | 90 | 93 |
| $N_2$ Surface area, sq. m./g | 168.8 | 150 | 154.8 | 306.2 |
| Oil absorption, cc./g | 1.02 | 1.00 | 1.37 | 0.77 |

Table I-C
EVALUATION OF CARBON BLACK IN RUBBER

| | Carbon Black from Crude Oil | | | |
|---|---|---|---|---|
| | A | B | C | D |
| | Monagas (Run Y-45) | Bella Vista (Run Y-31) | McFadden (Run Y-68) | Boscan (Run Y-78) |
| Compression Set, percent | 20.9 | 17.3 | 18.8 | 24.1 |
| Cross-linking, $\gamma \times 10^4$, mols./cc | 1.64 | 1.52 | 1.58 | 1.72 |
| 300% Modulus, p.s.i | 1,100 | 1,120 | 1,320 | 975 |
| Tensile, p.s.i | 3,415 | 3,685 | 3,670 | 2,900 |
| Elongation, percent | 555 | 595 | 550 | 525 |
| Heat build-up, °F | 61.5 | 60.2 | 64.2 | 57.8 |
| Permanent Set, percent | 2.4 | 2.1 | | |
| Resilience, percent | 58.3 | 55.1 | 55.9 | 58.2 |
| Shore Hardness | 63.0 | 60.5 | 64 | 62.5 |
| Compounded Mooney, MS-1½ | 40.5 | 39 | 49.0 | 43 |
| Scorch, 280° F., min. to 5-point rise | 13.8 | 13.5 | 13.4 | |
| Extrusion at 250° F.: | | | | |
| Inches/min | 39.8 | 25.6 | 44.5 | 29 |
| Grams/min | 107 | 65.0 | 114.5 | 71 |

EXAMPLE II

A sample of Managas crude oil having the properties set forth above in Table I-A was charged to an electrical desalting unit operated in conventional manner and the salt content of said crude oil reduced from 56.1 to 1.9 pounds per thousand barrels. The desalted crude oil was then charged through the coil of a visbreaker unit at a cold oil velocity of about 3 feet per second with the coil outlet being maintained at a temperature of about 1090° F. and a pressure of about 150 p.s.i.g. The coil effluent was immediately quenched to about 800° F. using distillate make from the operation as quench oil. The quenched oil effluent was then passed through an expansion valve, reducing the pressure to about 75 p.s.i.g., and the effluent from said expansion valve introduced into a hot oil separator where the distillate and gas (approximately 37 weight percent of the crude oil charge) flashed overhead.

The hot oil separator bottoms product was then charged to a vacuum flashing unit operated at about 650° F. and 2 millimeters mercury pressure. About 59 weight percent of said bottoms product charge was yielded overhead as a vacuum distillate oil and about 41 weight percent was yielded as a pitch having a ring and ball softening point of about 304° F. and a specific gravity of about 1.13.

The properties of said vacuum distillate oil, identified as feedstock E (F-118), are set forth in Table II-A below. A portion of said vacuum distillate oil was charged to a carbon black furnace of the type illustrated in FIGURE 2 and there partially burned under carbon black producing conditions to yield a carbon black product having an oil absorption of 1.3 cc. per gram. Furnace charging rates, operating conditions, and carbon black yield and properties of said carbon black product are set forth in Table II-B below. The oil absorption value of 1.3 cc. per gram of said carbon black product was surprising because since crude oil A had yielded a carbon black having an oil absorption of 1.02 cc. per gram (a relatively low structure furnace black), one would have expected to obtain a relatively low structure furnace black from said feedstock E.

A series of eight coking runs using the pitch from said vacuum flashing operation as the charging stock was carried out in a Curran-Knowles high temperature coking oven pilot plant. Said oven comprised an arched, rectangular chamber about 7 feet long and 5 feet wide. The height of the arch at the key was about 54 inches and about 45 inches at the side wall. The floor of the oven was constructed of carborundum brick and the oven was heated by gas burners placed under said floor. The operating procedure for all of said coking tests was as follows. The cold pitch was ground in a hammer mill to particles of about ½ inch and smaller. The oven charge for a single test ranged from 950 pounds to 1300 pounds. At the start of a test, with the oven flue temperature at 2000–2200° F., about 150 pounds of pitch was charged through a port in the top center of the hot oven. The remainder of the charge was added in 50 pound lots at 15 to 20 minute intervals. Occasionally, to maintain adequate coking temperature and to minimize frothing in the oven, the charging intervals were extended. A coking test was considered completed when the gas make from the oven had dropped to less than 100 cubic feet per hour. This generally occurred about 2 hours after the last of the pitch was charged. At the end of the test, the heat was cut back on the oven and the coke removed. During said coking tests the coking temperature ranged from 1500 to 1900° F. as measured by a thermocouple extending 6 inches inside the oven and 1 inch above the floor. The liquid product from all coking runs, averaging about 33 weight percent of the pitch charge, was combined and subjected to an atmospheric distillation to remove products nominally boiling below about 400° F. Tests on the remaining liquid products, i.e., the topped liquid products, are given in Table II–A below as feedstock F (F–131). The average coke yield from said coking tests was about 41 weight percent of the pitch charge.

A portion of said feedstock F (F–131) was charged to a carbon black furnace of the type illustrated in FIGURE 2 and therein partially burned under carbon black producing conditions to yield a relatively low structure furnace black having an oil absorption value of 0.82 cc. per gram. Said topped liquid products from the coking operation are thus an excellent feedstock for the production of relatively low structure furnace black. Furnace charging rates, operating conditions, and carbon black yield and properties are set forth in Table II–B below under column F, (Run Y–42R1).

The remainder of said topped liquid products from the coking operation was subjected to a vacuum flash distillation at about 650° F. and 5 millimeters mercury pressure. A vacuum gas oil, amounting to about 19.6 weight percent of the pitch charged to the above-described coking operation, was removed overhead from said vacuum flash unit. The remaining tar or pitch was about 4.6 weight percent of the pitch charged to said coking operation. The properties of said vacuum gas oil are set forth below in Table II–A as feedstock G (F–132). Said tar or pitch had an API gravity of −11.5 and is identified in Table III below as additive J, discussed further in Example III.

Said vacuum gas oil feedstock G (F–132) was charged to a carbon black furnace of the type illustrated in FIGURE 2 and therein partially burned under carbon black producing conditions to produce a carbon black having an oil absorption value of 1.41 cc. per gram. The production of this high structure carbon black from said feedstock G was surprising in view of the relatively low structure furnace black obtained from feedstock F, from which said feedstock G was made. Furnace charging rates, operating conditions, and carbon black yield and properties for the carbon black produced from said feedstock G are set forth in Table II–B below in column G, (Run Y–43).

Referring again to Table II–A, there are set forth therein tests on three conventional aromatic oil feedstocks, identified as H, H2, and H3, which are excellent charging stocks for the production of high structure furnace blacks. Said aromatic oils H, H2, and H3 were prepared in known manner by liquid sulfur dioxide extraction of cyclic oils obtained in the catalytic cracking of gas oils. Said oils H, H2, and H3 are included here as controls for comparisons with the charging stocks of the invention. Conventional aromatic oils used in the production of high structure furnace carbon blacks can include oils other than $SO_2$ extracts. Typical properties on such conventional oils are: boiling range 400 to 1000° F., BMCI 75 to 130, and an API gravity of from 0 to 20 degrees.

Samples of each of the carbon blacks produced as set forth in Table II–B below are compounded with SBR rubber employing the same rubber and the same recipe as set forth in Example I above except that the Santocure varied as set forth in Table II–C below. The resulting rubber compositions were cured to finished rubber compounds. One group of said rubber compositions was cured 30 minutes at 307° F. and properties were then determined according to standard rubber tests. The results of said rubber tests are set forth below in Table II–C.

In comparing the data given in Tables II–B and II–C, it should be noted that the carbon black produced from feedstock F (Run Y–42R1) was a relatively low structure furnace black having an oil absorption of 0.83 cc. per gram, whereas the carbon blacks produced from feedstock E (Run P–936) and feedstock G (Run Y–43) were high structure blacks having oil absorption values of 1.30 and 1.41 cc. per gram, respectively. As pointed out above, obtaining the high structure carbon black from feedstock E was surprising because crude oil A had yielded a relatively low structure furnace black. In view of the relatively low structure furnace black obtained from feedstock F, it was surprising that feedstock G would yield a high structure furnace black. It is believed clear from this example that the invention provides a process for producing both a relatively low structure furnace black and a high structure furnace black from the same crude oil.

*Table II–A*

FEEDSTOCKS FOR CARBON BLACK PRODUCTION

| | E | F | G | H | H2 | H3 |
|---|---|---|---|---|---|---|
| | Vac. Dist. Overhead From Visbroken Crude Oil A (F–118) | Topped Liquid Products From Coking Operation (F–131) | Gas Oil From Vac. Dist. of Coker Liquid Products (F–132) | Aromatic Concentrate Oils Controls | | |
| | | | | (B–237) | (B–247) | (B–214) |
| Gravity, °API | 16.6 | 2.8 | 8.5 | 10.8 | 11.0 | 13.4 |
| Vac. Dist., °F. at 760 mm. Hg: | | | | | | |
| First Drop | 457 | 496 | 468 | 449 | 470 | 422 |
| 5% overhead | 517 | 532 | 473 | 556 | 558 | 517 |
| 10% overhead | 586 | 571 | 520 | 578 | 586 | 553 |
| 20% overhead | 659 | 629 | 585 | 609 | 611 | 595 |
| 30% overhead | 718 | 685 | 649 | 630 | 639 | 622 |
| 40% overhead | 765 | 740 | 710 | 657 | 660 | 644 |
| 50% overhead | 820 | 795 | 766 | 673 | 681 | 663 |
| 60% overhead | 854 | 852 | 826 | 693 | 711 | 673 |
| 70% overhead | [1] 858 | 907 | 878 | 713 | 761 | 697 |
| 80% overhead | | 961 | 931 | 740 | 820 | 727 |
| 90% overhead | | | | 790 | [2] 867 | 773 |
| 95% overhead | | | | 831 | | |
| Viscosity: | | | | | | |
| SUS at 100° F | 420.8 | [3] 473.5 | 217.5 | 74.72 | 81.9 | 62.7 |
| SUS at 210° F | 53.28 | 99.3 | 42.4 | 35.38 | 37.6 | 34.5 |
| Pour Point, °F | 10 | 45 | 55 | 50 | 45 | 40 |
| Carbon content, wt. percent | 86.26 | 87.27 | 87.49 | 88.39 | 88.8 | 89.3 |
| Hydrogen content, wt. percent | 11.88 | 9.02 | 9.67 | 10.33 | 9.5 | 9.3 |
| Sulfur content, wt. percent | 1.83 | 2.60 | 2.52 | 1.35 | 1.29 | 1.4 |
| Carbon Residue Ramsbottom, wt. percent | 4.57 | 16.1 | 3.24 | 1.06 | 1.61 | 3.59 |
| BMCI | 64.2 | 112.2 | 92.9 | 91.7 | 90.4 | 83.7 |
| Potassium, p.p.m. (by wt.) | [4] Nil | 60 | [4] Nil | [4] Nil | | |

[1] 64%.  [2] 82%.  [3] 150°.  [4] 0.5 p.p.m. or less.

Table II-B
PRODUCTION OF CARBON BLACK

| | From Feedstock | | | | | |
|---|---|---|---|---|---|---|
| | E | F | G | H | H2 | H3 |
| | Run No. | | | | | |
| | P-936 | Y-42R1 | Y-43 | Y-52 | Y-60R1 | P-738 |
| Furnace Operating Conditions: | | | | | | |
| Oil feed rate, gal./hr | 169.7 | 5.75 | 5.60 | 5.98 | 6.20 | 218 |
| Preheat, °F | 560 | 550 | 550 | 550 | 550 | 735 |
| Tangential air rate, Mcfh | 140 | 6 | 6 | 6 | 6 | 140 |
| Tangential gas rate, Mcfh | 9.33 | 0.4 | 0.4 | 0.4 | 0.4 | 9.33 |
| Jacket air rate, Mcfh | 4 | 0.2 | 0.2 | 0.2 | 0.2 | 4 |
| Reaction section length, inches | 132 | 25 | 25 | 25 | 25 | 132 |
| Combustion section length, inches | 12 | 4 | 4 | 4 | 4 | 12 |
| Carbon Black Product: | | | | | | |
| Yield, lbs./gal | 2.54 | 2.88 | 2.22 | 2.61 | 2.80 | 3.87 |
| Photelometer | 86 | 91 | 91 | 89 | 91 | 90 |
| $N_2$ Surface area, sq. m./g | 86.0 | 146.1 | 161.9 | 153.9 | 135.3 | 82.0 |
| Oil absorption, cc./g | 1.30 | 0.83 | 1.41 | 1.55 | 1.45 | 1.41 |

Table II-C
EVALUATION OF CARBON BLACK IN RUBBER

| | E | F | G | H | H2 | H3 |
|---|---|---|---|---|---|---|
| Run No | P-936 | Y-42R1 | Y-43 | Y-52 | Y-60R1 | P-738 |
| Santocure, p.h.r | 0.8 | 0.9 | 0.9 | 0.9 | 0.9 | 0.8 |
| Compression Set, percent | 18.2 | 20.6 | 19.4 | 18.4 | 16.2 | 19.5 |
| Cross-linking, $\gamma \times 10^4$, mols/cc | 1.49 | 1.56 | 1.70 | 1.68 | 1.54 | 1.46 |
| 300% Modulus, p.s.i | 1250 | 890 | 1425 | 1385 | 1430 | 1300 |
| Tensile, p.s.i | 2875 | 3610 | 3760 | 3650 | 3410 | 2925 |
| Elongation, percent | 510 | 610 | 520 | 520 | 500 | 500 |
| Heat build-up, °F | 61.2 | 56.8 | 62.2 | 62.5 | 61.2 | 60.8 |
| Permanent Set, percent | | 1.1 | 1.9 | 1.8 | | |
| Resilience, percent | 58.8 | 59.8 | 58.9 | 57.7 | 58.2 | 58.2 |
| Shore Hardness | 62 | 60.5 | 64.0 | 65.0 | 61 | 61.5 |
| Compounded Mooney, MS-1½ | 31.5 | 38.0 | 36.5 | 37.5 | 37.5 | 31 |
| Scorch, 280° F., min. to 5-point rise | | 14.8 | 12.6 | 10.6 | 12.0 | |
| Extrusion at 250° F.: | | | | | | |
| Inches/min | | 35.5 | 36.8 | 40 | 38 | |
| Grams/min | | 93 | 103.5 | 112 | 101 | |

EXAMPLE III

The properties of said tar or pitch produced in Example II from the vacuum flash distillation of the topped liquid products from the coking operation are set forth in Table III below under the heading of additive J (F–135).

Also included in said Table III are two other high aromatic tars identified as X (F–149) and L, which tars were produced by methods different from the method employed in the production of said tar J. Said tar additive X is a filtered coal tar which resulted from the condensation of vapors obtained in the high temperature coking of coal at about 1800° F. The tar recovered from said liquid products was mixed 50–50 with xylene and filtered to remove grit, "coke breeze," and other solid materials. Tests on the resulting filtered coal tar after removal of the xylene are given in Table III below. Said tar additive L is the 51 weight percent bottoms product which remained after a vacuum flash distillation of said filtered coal tar X.

Said tar additives J, X, and L were used as additives in preparing blended feedstocks M (F–137), N (F–141), P (F–153), and Q (F–147) in the weight ratios given in Table III–A below. Tests on each of said blended feedstocks are also given in said Table III–A. Each of said blended feedstocks was separately charged to a carbon black producing furnace of the type illustrated in FIGURE 2 and therein partially burned under carbon black producing condition to yield a carbon black product. Furnace charge rates, operating conditions, and carbon black yields and properties of said carbon black products are set forth in Table III–B below.

Samples of said carbon black products were compounded with SBR rubber and the resulting rubber compositions cured to finished rubber compounds. The SBR rubber and compounding recipe used were the same as given in Example I above. One group of the resulting rubber compositions was cured 30 minutes at 307° F. and the properties thereof determined employing standard rubber testing procedures. The results of tests on said rubber compounds are set forth in Table III–C below.

In comparing the data given in Tables III–B and III–C, it should be noted that the carbon blacks produced from blended feedstocks M (F–137) and N (F–141), both of which contained tar additive J, were relatively low structure furnace blacks having oil absorption values of 0.82 cc. per gram and 1.10 cc. per gram, respectively, whereas the carbon blacks produced from blended feedstocks P (F–153) and Q (F–147) were high structure furnace blacks having oil absorption values of 1.45 cc. per gram and 1.58 cc. per gram, respectively. These data show that the tar recovered from the coking of the petroleum residue oil is a good additive for adding to a conventional aromatic feedstocks to enable the production of relatively low structure furnace black from said conventional feedstocks which would otherwise produce a high structure furnace black, whereas the tar recovered from the coking of coal is not a good additive which will enable the production of a relatively low structure furnace black from a conventional feedstock.

Table III
ADDITIVES FOR CARBON BLACK FEEDSTOCKS

|  | J | X | L |
|---|---|---|---|
|  | Tar From Vac. Dist. of Coker Liquid Products (F-135) | Filtered coal Tar (F-149) | 51% Pitch Bottoms From Vac. Dist. of Tar X |
| Gravity, °API | -11.5 | -16.5 | <0 |
| Vac. Dist., °F. at 760 mm. Hg: |  |  |  |
| First drop |  | 462 |  |
| 5% overhead |  | 571 |  |
| 10% overhead |  | 669 |  |
| 20% overhead |  | 733 |  |
| 30% overhead |  | 777 |  |
| 40% overhead |  | 808 |  |
| 50% overhead |  | 869 |  |
| 60% overhead |  | 911 |  |
| 63% overhead |  | 938 |  |
| Carbon content, wt. percent | 89.1 | 92.7 |  |
| Hydrogen content, wt. percent | 6.8 | 5.1 |  |
| Sulfur content, wt. percent | 2.8 | 0.7 |  |
| Ash, wt. percent | 0.13 | 0.15 |  |
| Potassium content, p.p.m. (by wt.) | *315 | <1 |  |

*Calculated on the basis that the topped liquid products from coking operation (F-131) (100%) by analysis contained 60 p.p.m., by wt., of potassium, and the gas oil (F-132) (81.1%) from vacuum distillation of said oil F-131 by analysis contained 0.5 p.p.m., by wt., of potassium. Thus F-135 (18.9%) contained 315 p.p.m., by wt., of potassium by difference.

Table III-A
BLENDED FEEDSTOCKS FOR CARBON BLACK PRODUCTION

|  | M | N | P | Q |
|---|---|---|---|---|
|  | 80% H 20% J (F-137) | 95% H[1] 5% J[1] F(-141) | 90% H[2][1] 10% L[1] (F-153) | 80% H[1] 20% X[1] (F-147) |
| Gravity, °API | 4.8 | 9.8 | 6.9 | 5.8 |
| Vac. Dist., °F. at 760 mm. Hg.: |  |  |  |  |
| First Drop | 486 | 457 | 419 | 455 |
| 5% overhead | 577 | 559 | 542 | 558 |
| 10% overhead | 610 | 589 | 577 | 578 |
| 20% overhead | 644 | 620 | 614 | 621 |
| 30% overhead | 665 | 645 | 641 | 658 |
| 40% overhead | 690 | 660 | 658 | 676 |
| 50% overhead | 715 | 679 | 683 | 696 |
| 60% overhead | 751 | 698 | 701 | 731 |
| 70% overhead | 820 | 725 | 733 | 762 |
| 80% overhead | [2]880 | 770 | 782 | 830 |
| 90% overhead |  | 845 | 894 | [3]939 |
| 95% overhead |  | [4]871 |  |  |
| Viscosity |  |  |  |  |
| SUS at 100° F | 650.6 | 123.8 | 151.6 | 203.1 |
| SUS at 210° F | 54.1 | 35.4 | 36.6 | 42.6 |
| Pour Point, °F | 45 | 45 | 45 | 40 |
| Carbon content, wt. percent | 88.8 | 88.4 | 89.5 | 89.5 |
| Hydrogen content, wt. percent | 8.9 | 9.4 | 9.0 | 8.7 |
| Sulfur content, wt. percent | 1.93 | 1.64 | 1.39 | 1.21 |
| Carbon Residue Ramsbottom, wt. percent | 14.45 | 1.67 | 3.03 | 9.35 |
| BMCI | 109.6 | 94.5 | 103.1 | 107.6 |
| Ash | 0.03 | 0.03 | 0.04 | 0.05 |
| Potassium, p.p.m. (by wt.) | [5]63 | [5]16 | 1.2 | Nil |

[1] See Table II-A and Table III.
[2] 75%.
[3] 85%.
[4] 91%.
[5] Calculated from analyses of blend components.
Nil=0.5 p.p.m. or less.

Table III-B
PRODUCTION OF CARBON BLACK

|  | From Blended Feedstock | | | |
|---|---|---|---|---|
|  | M | N | P | Q |
| Run No | Y-47 | Y-50 | Y-67 | Y-56 |
| Furnace Operating Conditions: |  |  |  |  |
| Oil feed rate, gal./hr | 6.38 | 6.07 | 5.84 | 6.76 |
| Preheat, °F | 550 | 550 | 550 | 550 |
| Tangential air rate, Mcfh | 6 | 6 | 6 | 6 |
| Tangential gas rate, Mcfh | 0.4 | 0.4 | 0.4 | 0.4 |
| Jacket air rate, Mcfh | 0.2 | 0.2 | 0.2 | 0.2 |
| Reaction section length, inches | 25 | 25 | 25 | 25 |
| Combustion section length, inches | 4 | 4 | 4 | 4 |
| Carbon Black Product: |  |  |  |  |
| Yield, lbs./gal | 3.30 | 2.80 | 3.27 | 3.62 |
| Photelometer | 91 | 90 | 98 | 90 |
| $N_2$ Surface area, sq. m./g | 131.4 | 146.5 | 149.1 | 123.5 |
| Oil absorption, cc./g | 0.82 | 1.10 | 1.45 | 1.58 |

Table III-C
EVALUATION OF CARBON BLACKS IN RUBBER

| Run No. | M | N | P | Q |
|---|---|---|---|---|
|  | Y-47 | Y-50 | Y-67 | Y-56 |
| Compression Set, Percent | 18.6 | 18.2 | 17.8 | 16.3 |
| Cross-linking, $\gamma \times 10^4$, mols/cc | 1.54 | 1.56 | 1.58 | 1.66 |
| 300% Modulus, p.s.i | 900 | 1,060 | 1,540 | 1,560 |
| Tensile, p.s.i | 3,650 | 3,950 | 3,510 | 3,340 |
| Elongation, Percent | 610 | 600 | 500 | 475 |
| Heat build-up, °F | 56.8 | 57.8 | 61.9 | 61.9 |
| Permanent Set, Percent | 2.0 | 2.2 |  |  |
| Resilience, Percent | 59.6 | 58.2 | 58.9 | 59.7 |
| Shore Hardness | 60.0 | 62.0 | 62.5 | 60.0 |
| Compounded Mooney, MS-1½ | 36.0 | 36.5 | 41.0 | 41.5 |
| Scorch, 280° F., min. to 5-point rise | 13.3 | 12.4 | 13.6 |  |
| Extrusion at 250° F.: |  |  |  |  |
| Inches/min | 37.2 | 37 | 41.5 | 37.5 |
| Grams/min | 101.5 | 105.5 | 112.8 | 112.5 |

In Tables IV and V the carbon blacks produced from charging stocks of the invention, including blended charging stocks containing the additive of the invention, are compared with a typical channel black and furnace blacks having a high structure. In Table IV it is to be noted the carbon black produced from crude oil A (Run Y-45), the carbon black produced from crude oil B (Run Y-31), the carbon black produced from crude oil D (Run Y-78), In Table V it should be noted that the furnace blacks of the invention which have a high structure, e.g., the carbon black from oil E (Run P-936) and oil G (Run Y-43) compare favorably with the carbon blacks produced from conventional aromatic oils H (Run Y-52), H2 (Run Y-60R1), and H3 (Run P-738).

Table IV
COMPARISON OF CARBON BLACKS

|  | Carbon Blacks of Invention Relatively Low Structure | | | | | | Typical Channel Black |
|---|---|---|---|---|---|---|---|
|  | A | B | D | F | M | N |  |
| Run No. | Y-45 | Y-31 | Y-78 | Y-42R1 | Y-47 | Y-50 |  |
| Carbon Black Properties: |  |  |  |  |  |  |  |
| Oil absorption, cc./g. | 1.02 | 1.00 | 0.77 | 0.83 | 0.82 | 1.10 | 0.9 |
| $N_2$ Surface area, sq. m./g. | 168.8 | 150 | 306.2 | 146.1 | 131.4 | 146.5 | 114 |
| Rubber Properties: |  |  |  |  |  |  |  |
| 300% Modulus, p.s.i. | 1,100 | 1,120 | 975 | 890 | 900 | 1,060 | 775 |
| Heat build-up, °F. | 61.5 | 60.2 | 57.8 | 56.8 | 56.8 | 57.8 | 60.5 |
| Compounded Mooney, MS-1½ | 40.5 | 39 | 43 | 38 | 36 | 36.5 | 27 |
| Scorch, 280° F., min. to 5-point rise | 13.8 | 13.5 |  | 14.8 | 13.3 | 12.4 |  |
| Extrusion at 250° F., in./min. | 39.8 | 25.6 | 29 | 35.5 | 37.2 | 37 | 32 |

A=Monagas Crude Oil. (See F-134 in Table I-A.)
B=Bella Vista Crude Oil. (See F-99 in Table I-A.)
D=Boscan Crude Oil. (See F-155 in Table I-A.)
F=Topped Liquid Products From Coking Operation. (See F-131 in Table II-A.)
M=80% Aromatic Concentrate Oil H (B-237) and 20% Tar From Vac. Dist. of Coker Liquid Products (F-135). (See F-137 in Table III-A.)
N=95% blend of same components as oil M. (See F-141 in Table III-A.)

Table V
COMPARISON OF CARBON BLACKS

|  | Control Carbon Blacks | | | Carbon Blacks of Invention High Structure | |
|---|---|---|---|---|---|
|  | H | H2 | H3 | E | G |
| Run No. | Y-52 | Y-60R1 | P-738 | P-936 | Y-43 |
| Carbon Black Properties: |  |  |  |  |  |
| Oil absorption, cc./g. | 1.55 | 1.45 | 1.41 | 1.30 | 1.41 |
| $N_2$ Surface area, sq. m./g. | 153.9 | 135.3 | 82.0 | 86 | 161.9 |
| Yield, lbs./gal. | 2.61 | 2.80 | 3.87 | 2.54 | 2.22 |
| Rubber Properties: |  |  |  |  |  |
| 300% Modulus, p.s.i. | 1385 | 1430 | 1300 | 1250 | 1425 |
| Heat build-up, °F. | 62.5 | 61.2 | 60.8 | 61.2 | 62.2 |
| Compounded Mooney, MS-1½ | 37.5 | 37.5 | 31 | 31.5 | 36.5 |
| Scorch, 280° F., min. to 5-point rise | 10.6 | 12.0 |  |  | 12.6 |
| Extrusion at 250° F., in./min. | 40 | 38 |  |  | 36.8 |

H, H2, and H3=Conventional aromatic concentrate oils (See B-237, B-247, and B-214, respectively, in Table II-A).
E=Vac. Dist. Overhead from Crude Oil A (See F-118 in Table II-A).
G=Gas Oil from Vac. Dist. of Coker Liquid Products (See F-132 in Table II-A).

the carbon black produced from oil F (Run Y-42R1), the carbon black produced from blended oil M (Run Y-47), and the carbon black produced from blended oil N (Run Y-50) were all relatively low structure furnace blacks as shown by their oil absorption values. Said relatively low structure furnace blacks compare favorably with a typical channel black, the properties of which are also set forth in Table IV, showing that the relatively low structure furnace carbon blacks of the invention can be used to replace channel black in many applications. Said Table IV includes the most significant properties of the rubber compounds prepared from each of said carbon blacks as set forth in the above Examples I–III. The rubber compound containing said channel black was prepared in the same manner and using the same SBR rubber and compounding recipe as in Example I except that the amount of Santocure was 1.0 instead of 0.9. It is to be noted that the oil absorption values of said carbon blacks correlate very well with the properties of the rubber compounds. For example, when blended with SBR rubber, the carbon blacks of the invention having the lowest oil absorption values produced rubber compounds having the lowest 300 percent modulus. These data confirm that oil absorption is a reliable measure of structure in carbon blacks.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is employed to indicate the quality of carbon blacks. In such a test, two grams of the black is slurried with 50 milliliters of a colorless solvent such as chloroform, toluene, benzene, acetone, xylene or carbon tetrachloride. The slurry is heated to the boiling point in one to two minutes and then filtered. The filtrate is cooled and placed in the photelometer cell. Radiation is passed through the cell and the transmission is measured. The percent transmission is referred to as the "photelometer reading," and serves to indicate the tarry residue present in the carbon black. Methods of controlling the quality of furnace blacks employing said photelometer tests are set forth in said Patent 2,892,684.

In the above tables the term "300 percent modulus, p.s.i." refers to the pounds per square inch pull in a tension test when the test piece of vulcanized rubber has been stretched 300 percent of the length of the original test piece. The term "tensile p.s.i." represents the pounds per square inch pull at the point of rupture or break of the test piece undergoing the above-mentioned 300 percent modulus test. The term "elongation" represents the stretch or elongation at the point of break. All of said tests are determined in accordance with ASTM D 412–51T, and are carried out at 80° F. unless otherwise designated.

The "heat build-up" or hysteresis as used herein may be defined as the temperature rise in ° F. above 100° F. of a sample of rubber of standard size when exposed to rapid flexing under standardized conditions and is determined in accordance with ASTM D–623–58, Method A.

The "resilience" is the complement of the hysteresis loss, or more simply expressed, is a measure of the potential energy of a piece of rubber that is present as a result of applied stress and which is recoverable when the stress is removed. As used herein, resilience is measured by ASTM 945–55 using a modified Yersley oscillograph. The test specimen was a right circular cylinder of 0.70 inch diameter and 1.0 inch height.

"Compression set" is determined by ASTM D–395–55, Method B, modified (0.325 inch spacers), compressed two hours at 212° F. plus relaxation for one hour at 212° F.

"Cross-linking" is determined from the reciprocal volume swell and equilibrium modulus as described by P. J. Flory, J. Rehner, Jr., Journal of Chemical Physics, 11, 521 (1943) and P. J. Flory, Ibid., 18, 108 (1950).

"Permanent set" is determined by ASTM D–623–58, Method A.

"Shore hardness" is determined by ASTM D–676–59T, using a Shore durometer, Type A and a 80° F. test temperature unless otherwise noted.

"Compounded Mooney MS–1½" is determined according to ASTM D–927–57T using a Mooney viscometer, small rotor, 1.5 minutes, 212° F. temperature, unless otherwise noted.

"Scorch" is determined according to ASTM D–1077–55T using a Mooney viscometer with a large rotor. Scorch is defined as the minutes to a 5-point rise above minimum Mooney.

"Extrusion" is determined using a No. ½ Royle extruder with Garvey die as described in Ind. Eng. Chem. 34, 1309 (1942).

The potassium analyses reported herein were determined by flame photometry. In this method of analysis the sample is dissolved in a suitable potassium-free, non-aromatic solvent (acetone is the most commonly used solvent) and the resulting solution sprayed into a flame. The intensity of the potassium radiation is measured and compared with that of samples of known potassium concentrations prepared from a known oil soluble potassium containing sample obtained from the National Bureau of Standards.

While the various distillation steps employed in the practice of the inventon have been described as flash distillations it is within the scope of the invention to employ other types of distillations affording a more precise separation of the materials being distilled. Thus, as used herein and in the claims, unless otherwise specified, the term "distillation" is employed generically and includes both flash distillations and other types of distillations such as fractional distillations.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for producing an aromatic feedstock for the production of carbon black, which process comprises:

charging to a mild thermal cracking operation a heavy naphthenic crude oil having an API gravity of less than 20 degrees, a SUS viscosity at 210° F. within the range of about 40 to about 600, and containing at least 1.5 parts of potassium per million parts, by weight, of said oil;

distilling the effluent from said cracking operation to obtain a pitch residue;

charging said pitch to a coikng operation; and recovering said aromatic feedstock as a distillate nominally boiling above about 400° F. from the liquid products formed during said coking operation.

2. A process for producing a carbon black from a heavy naphthenic petroleum crude oil having an API gravity of less than 20 degrees, a SUS viscosity at 210° F. within the range of about 40 to about 600, and containing at least 1.5 parts of potassium per million parts, by weight, of said oil, which process comprises:

charging said crude oil to a mild thermal cracking operation;

recovering a pitch residue by distilling the effluent from said cracking operation;

charging said pitch to a coking operation;

recovering an aromatic distillate nominally boiling above about 400° F. from said coking operation;

partially burning said aromatic distillate in a carbon black furnace under carbon black producing conditions; and recovering carbon black from the effluent from said furnace.

3. A process for producing an aromatic feedstock for the production of a high structure carbon black, which process comprises:

charging to a mild thermal cracking operation a heavy naphthenic crude oil having an API gravity of less thean 20 degrees, a SUS viscosity at 210° F. within the range of about 40 to about 600, and containing at least 1.5 parts of potassium per million parts, by weight, of said oil;

distilling the effluent from said cracking operation to obtain a pitch residue;

charging said pitch to a coking operation;

recovering aromatic liquid products nominally boiling above about 400° F. from said coking operation; and vacuum distilling said aromatic liquid products to obtain an aromatic gas oil as said aromatic feedstock.

4. A process for producing a high structure carbon black from a heavy naphthenic petroleum crude oil having an API gravity of less than 20 degrees, and a SUS viscosity at 210° F. within the range of about 40 to about 600, and containing at least 1.5 parts of potassium per million parts, by weight, of said oil, which process comprises:

charging said crude oil to a mild thermal cracking operation;

distilling the effluent from said cracking operation to obtain a pitch residue;

charging said pitch to a coking operation;

recovering aromatic liquid products nominally boiling above about 400° F. from said coking operation;

vacuum distilling said aromatic liquid products to obtain an aromatic gas oil distillate as overhead therefrom;

partially burning said aromatic gas oil distillate in a carbon black furnace under carbon black producing conditions; and recovering carbon black from the effluent from said carbon black furnace.

5. A process for producing a first aromatic feedstock suitable for the production of a relatively low structure furnace carbon black and a second aromatic feedstock suitable for the production of a high structure furnace carbon black, which process comprises:

charging to a vis-breaking operation a heavy naphthenic crude oil having an API gravity of less than 20 degrees, a SUS viscosity within the range of about 40 to about 600, and containing at least 1.5 parts of potassium per million parts, by weight, of said oil;

distilling the effluent from said vis-breaking operation to obtain a pitch residue;

charging said pitch to a coking operation;

recovering aromatic liquid products nominally boiling above about 400° F. from said coking operation, said aromatic liquid products being said first aromatic feedstock;

vacuum distilling a portion of said aromatic liquid products; and recovering an overhead vacuum distillate gas oil from said vacuum distillation operation as said second aromatic feedstock.

6. A process for producing both a relatively low structure furnace carbon black and a high structure furnace carbon black from a heavy naphthenic petroleum crude oil having an API gravity of less than 20 degrees, a SUS viscosity at 210° F. within the range of about 40 to about 600, and containing at least 1.5 parts of potassium per million parts, by weight, of said oil, which process comprises:

charging said crude oil to a vis-breaking operation;

distilling the effluent from said vis-breaking operation to obtain a pitch residue;

charging said pitch to a coking operation;

recovering aromatic liquid products nominally boiling above about 400° F. from said coking operation;

partially burning a portion of said aromatic liquid products in a first carbon black furnace under carbon black producing conditions;

recovering a relatively low structure carbon black from the effluent from said first carbon black furnace;

vacuum distilling a portion of said aromatic liquid products to obtain an aromatic gas oil distillate and a tar residue;

partially burning said aromatic gas oil distillate in a second carbon black furnace under carbon black producing conditions; and recovering a high structure carbon black from the effluent from said second carbon black furnace.

7. A process for producing an aromatic feedstock for the production of a relatively low structure carbon black, which process comprises:

charging to a mild thermal cracking operation a heavy naphthenic crude oil having an API gravity of less than 20 degrees, a SUS viscosity at 210° F. within the range of about 40 to about 600, and containing at least 1.5 parts of potassium per million parts, by weight, of said oil;

distilling the effluent from said cracking operation to obtain a pitch residue;

charging said pitch to a coking operation;

recovering aromatic liquid products nominally boiling above about 400° F. from said coking operation;

vacuum distilling said aromatic liquid products to obtain an aromatic gas oil distillate and a tar residue; and blending said tar residue with a light aromatic concentrate oil to produce a blend comprising from about 4 to about 50 weight percent of said tar residue and from about 96 to about 50 weight percent of said aromatic concentrate.

8. A process for producing a relatively low structure furnace carbon black from a heavy naphthenic petroleum crude oil having an API gravity of less than 20 degrees, a SUS viscosity at 210° F. within the range of about 40 to about 600, and containing at least 1.5 parts of potassium per million parts, by weight, of said oil, which process comprises:

charging said crude oil to a mild thermal cracking operation;

distilling the effluent from said cracking operation to obtain a pitch residue;

charging said pitch to a coking operation;

recovering aromatic liquid products nominally boiling above about 400° F. from said coking operation;

vacuum distilling said aromatic liquid products to obtain an aromatic gas oil distillate and a tar residue;

blending said tar residue with a light aromatic concentrate oil to produce a blend comprising from about 4 to about 50 weight percent of said tar residue and from about 96 to about 50 weight percent of said aromatic concentrate; and partially burning said blended oil in a carbon black furnace under carbon black producing conditions and recovering said relatively low structure carbon black from the effluent from said carbon black furnace.

9. An additive for blending with an aromatic concentrate oil to enable the production of a relatively low structure furnace carbon black from said aromatic concentrate oil which would otherwise yield a high structure carbon black when partially burned in a carbon black furnace under carbon black producing conditions, said additive being prepared by:

charging to a mild thermal cracking operation a heavy naphthenic crude oil having an API gravity of less than 20 degrees, a SUS viscosity at 210° F. within the range of about 40 to about 600, and containing at least 1.5 parts of potassium per million parts, by weight, of said oil;

distilling the effluent from said cracking operation to obtain a pitch residue;

charging said pitch to a coking operation;

recovering aromatic liquid products nominally boiling above about 400° F. from said coking operation;

charging said aromatic liquid products to a vacuum distillation operation and recovering therefrom a tar residue nominally boiling above 1050° F. as said additive.

10. An aromatic oil feedstock, suitable for the production therefrom of a relatively low structure carbon black, said feedstock comprising: from about 96 to about 50 weight percent of an aromatic concentrate oil having an API gravity within the range of from 0 to 20 degrees, a Bureau of Mines Correlation Index within the range of from 75 to 130, and boiling within the range of 400 to 1000° F.; and from about 4 to about 50 weight percent of a tar residue additive prepared by:

charging to a mild thermal cracking operation a heavy naphthenic crude oil having an API gravity of less than 20 degrees, a SUS viscosity at 210° F. within the range of about 40 to about 600, and containing at least 1.5 parts of potassium per million parts, by weight, of said oil;

distilling the effluent from said cracking operation to obtain a pitch residue;

charging said pitch to a coking operation;

recovering aromatic liquid products nominally boiling above about 400° F. from said coking operation;

charging said aromatic liquid products to a vacuum distillation operation and recovering therefrom a tar residue nominally boiling above 1050° F. as said additive.

References Cited by the Examiner

UNITED STATES PATENTS

| | | | |
|---|---|---|---|
| 2,794,749 | 6/1957 | Schulze | 106—307 |
| 2,914,418 | 11/1959 | Eastman | 106—307 |
| 3,010,794 | 11/1961 | Friauf et al. | 23—209.4 |
| 3,015,543 | 1/1962 | Frey | 23—209.4 |

MAURICE A. BRINDISI, *Primary Examiner.*

JOSEPH REBOLD, *Examiner.*